United States Patent [19]
Bappert

[11] 3,911,781
[45] Oct. 14, 1975

[54] ANCHOR SLEEVE FOR USE IN BORES FORMED IN RELATIVELY EASILY FRIABLE MATERIALS

[75] Inventor: Adolf Bappert, Denzlingen, Germany

[73] Assignee: Upat-Max Langensiepen KG, Emmendingen, Germany

[22] Filed: Nov. 20, 1973

[21] Appl. No.: 417,522

[30] Foreign Application Priority Data
Nov. 21, 1972 Germany............................ 2256938

[52] U.S. Cl. .......................................... 85/47; 85/43
[51] Int. Cl.² ............................................ F16B 25/00
[58] Field of Search ............... 85/83, 84, 81, 47, 72, 85/43; 151/41.73

[56] References Cited
UNITED STATES PATENTS

| | | | |
|---|---|---|---|
| 126,366 | 4/1872 | Wills | 85/43 |
| 465,101 | 12/1891 | Richars | 85/43 |
| 734,326 | 7/1903 | Hicks | 85/83 |
| 1,099,668 | 6/1914 | Rosenberg | 85/72 |
| 1,168,770 | 1/1916 | Wagner | 85/83 |
| 1,465,148 | 8/1923 | Rosenberg | 85/47 |
| 1,972,715 | 9/1934 | Pleister et al. | 85/72 |
| 2,881,652 | 4/1959 | Swaim | 85/47 |
| 3,022,701 | 2/1962 | Potruch | 85/83 |
| 3,143,917 | 8/1964 | Conner | 85/83 |
| 3,434,521 | 3/1969 | Flora | 85/83 |

FOREIGN PATENTS OR APPLICATIONS

| | | | |
|---|---|---|---|
| 387,262 | 5/1965 | Switzerland | 85/83 |
| 466,039 | 5/1937 | United Kingdom | 85/47 |
| 486,004 | 5/1938 | United Kingdom | 85/83 |
| 1,482,415 | 4/1967 | France | 85/47 |
| 857,142 | 11/1952 | Germany | 85/83 |

*Primary Examiner*—Marion Parsons, Jr.
*Attorney, Agent, or Firm*—Michael S. Striker

[57] ABSTRACT

A tubular sleeve body has a leading end, a trailing end and an outer circumferential surface. The outer circumferential surface is formed with a screw-thread which projects outwardly from it and which has at least one self-tapping edge, so that the edge forms an internal passage in the material when the tubular body is turningly inserted into the bore.

14 Claims, 8 Drawing Figures

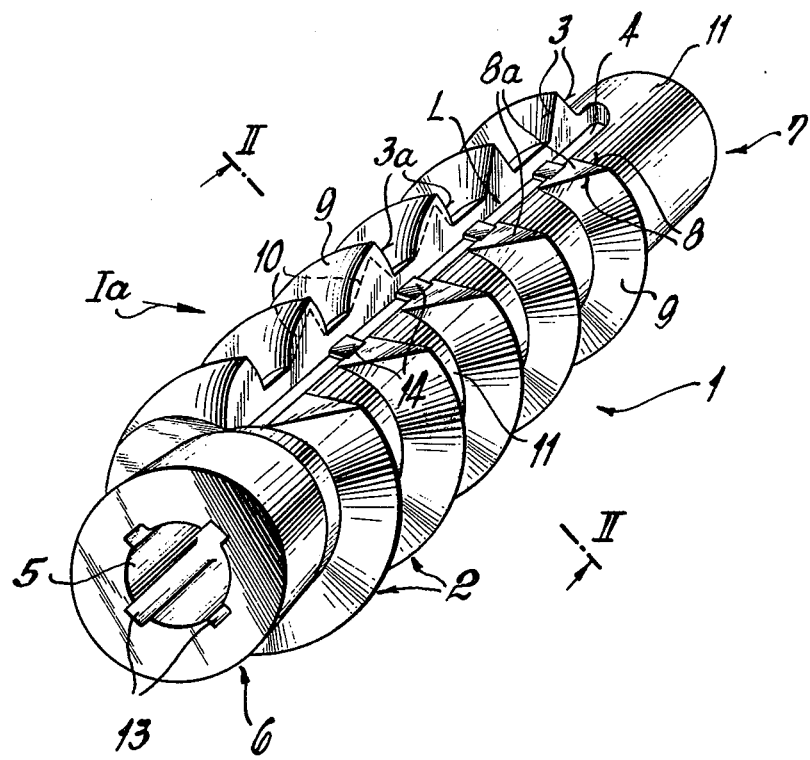
FIG.1
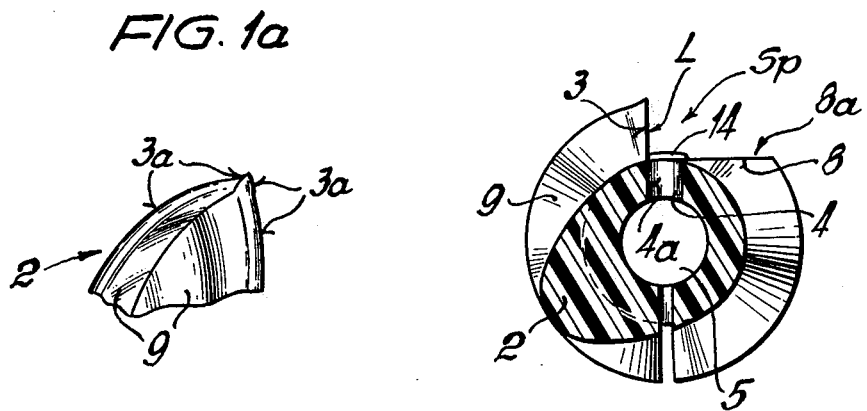
FIG.1a
FIG.2

ANCHOR SLEEVE FOR USE IN BORES FORMED IN RELATIVELY EASILY FRIABLE MATERIALS

BACKGROUND OF THE INVENTION

The present invention relates generally to anchors, and more particularly to anchoring sleeves which are particularly suitable for use in relatively easily friable materials, that is materials such as gypsum or the like which have relatively low cohesion under stress.

Use of anchors, particularly expansion anchors, for fastening various objects to walls, ceilings and the like is well established in the art. However, conventional anchors are not well suited —although they can be used— for securement in certain types of materials. Such materials are those which are relatively easily friable, that is gypsum or the like which tends to disintegrate over a period of time when the inserted anchor sleeve is subjected to stresses which are transmitted to the material in which it is anchored. Thus, although the sleeve may initially be anchored firmly in the support material, such as a wall or the like, over a period of time it will become loosened and can then be readily extracted. This means that even if anchors of rather large sizes are employed, they cannot be relied upon to hold relatively heavy objects such as wash basins, hanging cabinets, bookshelves and the like, at least not in the long run. This type of connection is, however, becoming more and more popular while at the same time walls and similar support structures on which the objects are to be anchored are being made less and less strong in an effort to save materials and reduce construction costs. Heretofore, expansion bolts and similar relatively complicated devices have had to be used, extending all the way through the wall and providing at the reverse side of the wall an enlargement which engages the wall about the bore through which they extend, in order to provide the necessary security against undesired loosening. Evidently, this is an arrangement which is relatively complicated and which requires also a certain amount of skill on the part of the person installing it.

SUMMARY OF THE INVENTION

It is therefore a general object of the present invention to overcome the disadvantages of the prior art.

More particularly, it is an object of the present invention to provide an improved anchor sleeve which is particularly suitable for use in bores formed in material having relatively low cohesion under stress, that is material which is relatively readily friable under stress.

An additional object of the invention is to provide such an improved anchor sleeve which can be readily installed and which provides reliable anchoring in the material, which anchoring will remain reliable even over a prolonged period of time and under substantial stress.

In keeping with the above objects, and others will become apparent hereafter, one feature of the invention resides in an anchor sleeve for use in bores formed in material having relatively low cohesion under stress, such as gypsum walls. The sleeve comprises a tubular body having a leading end, a trailing end and an outer circumferential surface. A screw-thread is formed on and projects from the outer circumferential surface intermediate the ends. It has at least one self-tapping edge so that the edge forms an internal passage in the material for the screw-thread when the body is threaded into a bore in the material. When this body is so inserted into a bore formed in relatively readily friable material its outer circumferential surface and the surfaces bounding the flights of the screw-thread provide a combined surface area which is rather large and via which any stresses acting upon the sleeve are distributed into the support material in such a manner that local stresses entering into the support material are not high enough to cause its destruction.

It is advantageous if all edges along a longitudinal line of the sleeve are constructed as self-tapping edges, and at least one and preferably both edges adjacent a flank of the screw-thread can extend slightly beyond the latter.

These edges form a thread-like passage in the support material as the sleeve is inserted into the bore of the support material while being rotated, so that during such insertion the flanks of the screw thread flights can pass through these passages and do not exert sufficient pressure upon the surrounding material to cause the latter to disintegrate.

It is advantageous if as seen in the direction of rotation which is to be imparted to the sleeve as it is inserted into the bore hole, immediately ahead of the self-tapping edge or edges there is provided a slot-shaped recess which may communicate with the interior of the sleeve and in which particles of the material that have been dislodged can accumulate, rather than being compressed against the inner wall bounding the bore and thus inhibiting the ready insertion of the sleeve. The particles may even enter into the interior of the sleeve from where they can be removed without difficulty to the exterior.

By contrast to conventional screw-threads on screws, the outer diameter of the screw-thread on the sleeve according to the present invention can be substantially than the outer diameter of the sleeve body itself, preferably in a ratio of between substantially 3:1 and 1.8:1. The pitch of the screw thread can be between substantially 10 and 15 mm, and 12 mm are currently preferred. Tests have shown that the aforementioned diameter ratios and the pitch conditions are particularly advantageous. The sleeve body may be provided at or in the region of its trailing end with portions such as grooves or the like into which a tool (for instance a screwdriver) can be inserted to facilitate turning of the sleeve, that is threading of the same into the bore.

At the trailing end the sleeve may be reinforced by having an enlarged portion, for instance of frustoconical configuration. This has the advantage, inter alia, that the breaking-away of the material which has occurred at the outer end of the bore hole will be covered and concealed. Another advantage is that the sleeve itself is reinforced which is advantageous for various reasons, including the necessity to exert sufficient force upon the sleeve to turn it and thread it into the bore.

This threading-in can be further facilitated if the outer diameter of the screw thread is made in such a manner that it increases from the leading end towards the trailing end, which increase may be continued. Such an arrangement assures that as the sleeve enters deeper into the bore, the force required for turning it will remain substantially uniform.

In order to assure that the material being dislodged during the threading-in of the sleeve has sufficient room to move out of the way, the thread may be provided with a flattened portion, as will be discussed subsequently. It may also be provided with a recess or cutout serving the same purpose.

The sleeve itself may advantageously be of a synthetic plastic material, such as nylon or the like to assure ease of later insertion of a securing element, such as a screw or the like which is to be introduced into the center passage of the sleeve to hold the object on it, the inner wall bounding the center passage can be preformed in thread-like configuration. The curling end of the sleeve may be provided with a transverse flange which prevents the sleeve from entering too deeply into the bore in that it will abut against the outer surface of the support material.

The enlarged portion may also be provided with a cutout bounded in part by a self-cutting or tapping edge.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view of an anchor sleeve according to the present invention;

FIG. 1a is a fragmentary view of a portion of the screw-thread, as seen in the direction of the arrow A in FIG. 1, in a perspective view;

FIG. 2 is a section taken on line II—II of FIG. 1;

DESCRIPTION OF THE PREFERRED EMBODIMENTS

Figure 1B:
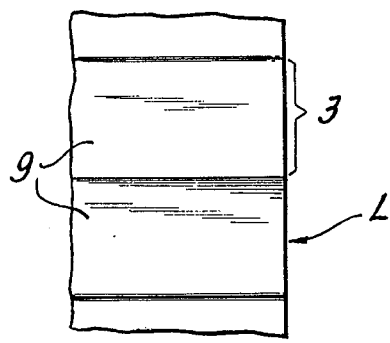
FIG. 1b is a diagrammatic detail view in the direction of arrow B in FIG. 1.
Figure 1C:
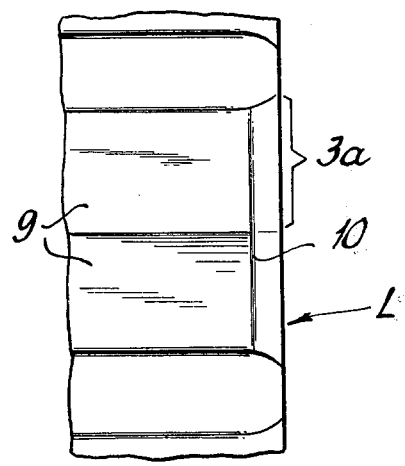
FIG. 1c is a view similar to FIG. 1b, but seen in the direction of the arrow C.

Referring now to the drawing, which shows in FIGS. 1–5 a single embodiment of the invention, it will be seen that reference numeral 1 identifies a novel anchor sleeve according to the present invention. The sleeve has portions forming on its outer circumferential surface a projecting screw-thread and, as seen in the drawing, along a longitudinal line L the edges 3 of the screw thread 2 are configured as self-tapping or self-cutting edges. Immediately adjacent the same the body of the sleeve 1 is formed with a slotshaped recess 4 communicating with the interior axial passage 5 and into which particles of the material wherein the sleeve is to be threaded can enter.

As shown in FIG. 2, the screw-threads 2 are flattened in the plane of the self-tapping edges 3, as seen in the direction in which the sleeve has to be rotated to be inserted into the bore, immediately ahead of the cutout 4. This means that particles of the material which have been dislodged are not pushed ahead of the edges 3, but are diverted directly into the cutout 4. If the latter is not able to accommodate the entire quantity of particles dislodged during threading of the sleeve into a bore hold, the remaining dislodged particles can enter into the recess Sp which is also provided and formed by the edges 3 located in a plane L and the surface portions 8a of the flattened parts 8. These define together the recess Sp which can of course have a different cross-sectional angular configuration than the one that is illustrated. Further space for dislodged particles is obtained by forming the body of the sleeve with a groove 15 which may be made of such a depth as to accommodate a desired amount of dislodged particles.

Figure 3:
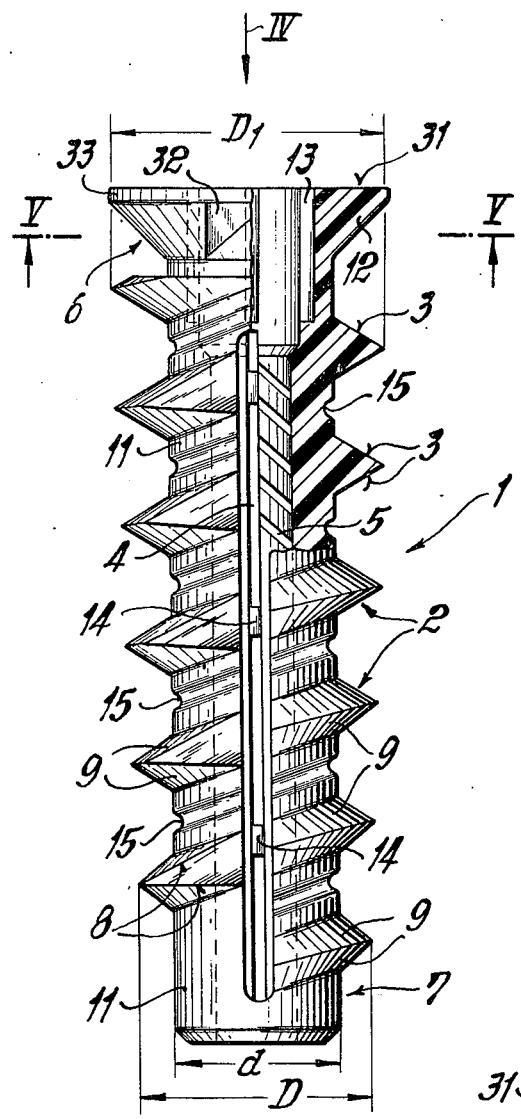
FIG. 3 is a partial side view and partial section of the anchor sleeve shown in FIG. 1.

FIG. 3 shows the sleeve on an enlarged scale, and in particular indicates the diameter relationship between the outer diameter of the sleeve and the outer diameter of the thread 2, which is characteristic for the invention, as well as the similarly characteristic pitch of the threads 2. The outer diameter of the threads 2 is identified with character D and is approximately double the outer diameter of the sleeve 1, which is identified with character d. However, it is emphasized that a ratio of D:d of approximately 3:1 up to approximately 3.8:1 can be utilized. The pitch of the thread 2 is such that the space between the individual flights or convolutions of the thread is approximately 12 mm in the illustrated embodiment, but it can be selected to be anywhere between substantially 10 and 15 mm.

FIG. 1 shows that the flanks 9 of the respective screw-threads may be somewhat axially broadened at a self-tapping edge 3a, as also shown in FIG. 1a. The broken line 10 represents the flank 9 which is immediately following the edge 3a. The thus projecting edge or edges 3a cut, during the threading of the sleeve into the bore hole, a formation of a somewhat wider track in the material so that subsequently the development of pressure upon the material by engagement on both sides of the passage with the flanks 9 is avoided. The edges 3 or 3a will remain sharp during the entire inserting operation, whether the sleeve 1 is of appropriate synthetic plastic material or metal, and will thus perform the desired function.

FIG. 1a is a view of a portion of one flight of the thread 2, showing the contour of the flanks 9 and indicating how the edges 3 project slightly by comparison with respect to the edges 3. This, incidentally, is also seen by a comparison of the edges 3 and 3a in FIG. 1, and in FIGS. 1b and 1c.

FIG. 3 shows that the edges 3 or 3a increase continuously in diameter in the direction towards the trailing end 6 of the sleeve, so that the diameter $D_1$ is greater than the diameter D. This avoids excessive force being transmitted to the surrounding material during insertion of the sleeve, particularly at the leading end 7 thereof. If desired, all of the edges can be configured as edges 3a, rather than as edges 3.

Figure 5:
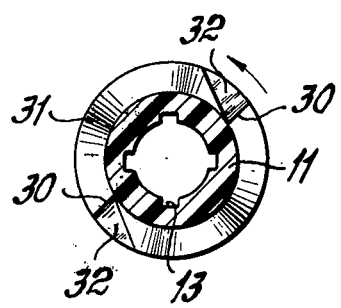
FIG. 5 is a reduced-scale section taken on line V—V of FIG. 3.
Figure 4:
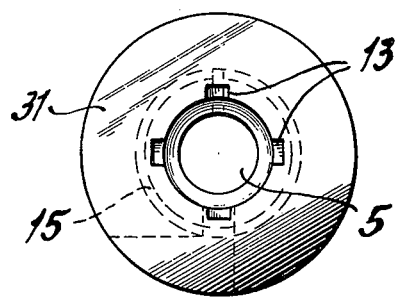
FIG. 4 is an end view as seen in the direction of the arrow E in FIG. 4.

The sleeve will be seen in FIGS. 3 and 5 to have a frustoconical enlargement at its trailing end 6, being identified with reference numeral 12 and being formed with at least one cutting edge 30 which extends close to the flange 31. In this manner the sleeve can be threaded into a bore hole of a support structure until its flange 31 is flush with the material of the support structure. Moreover, the enlargement 12 of course acts in a stabilizing manner and prevents to a large extent any deformation of the sleeve when the latter is being turned, particularly if this is done by means of a tool such as a screwdriver. The latter possibility is facilitated by forming the grooves 13 or the like into which a blade of a screwdriver or the like can be inserted. It is desired that after the installation the sleeve should not be expanded when a screw or the like is threaded into its center passage 5. To obtain this, the slot-head cutouts 4 are interrupted by webs 14, preferably in the region of the passage 5 so that a screw or the like which is threaded into the passage 5 cannot uncontrollably expand the sleeve which might exert too much pressure upon the surrounding material and cause the same to crumble. Also, expansion of the sleeve might result in inadequate retention of the screw.

FIG. 5 is a section taken on line V—V of FIG. 3, showing cutouts 32 and the cutting edges 30 which serve to remove material of the support structure during threading of the sleeve 1 into the latter, so that the enlarged portion 12 can form its own countersunk hole in the support structure into which it can enter.

It will be understood that each of the elements described above, or two or more together, may also find a useful application in other types of constructions differing from the types described above.

While the invention has been illustrated and described as embodied in an anchoring sleeve for use in relatively readily friable materials, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An anchor sleeve for use in bores formed in material having relatively low cohesion, such as gypsum walls, comprising a non-expanding tubular body having a leading end, a trailing end, and an outer circumferential surface; a screw-thread formed on and projecting from said outer circumferential surface intermediate said ends and having a plurality of screw flights and at least one self-tapping edge which forms an internal passage in said material for said screw-thread when said body is threaded in one direction into a bore in the material, said edge having a pair of flanks adjacent to and projecting outwardly beyond one of said screw flights; a recess formed in said screw-thread intermediate said ends and extending substantially to said surface, said recess being bounded on its one side by a line extending axially of said body and on its other side by surface portions of the respective screw flights; and a slot formed in said body intermediate but short of said ends and ahead of said surface portions, seen with reference to said direction, and communicating with said recess and with the interior of said body, said slot being dimensioned so large that particles of said material dislodged by said screw flights can freely enter via said recess and slot into said interior to thereby reduce the resistance opposed by said material to turning of said body.

2. An anchor sleeve as defined in claim 1, wherein said screw-thread has a plurality of edges, and wherein all of said edges are configurated as self-tapping edges.

3. An anchor sleeve as defined in claim 2, wherein said edges are all located on a line extending longitudinally of said sleeve.

4. An anchor sleeve as defined in claim 1, wherein said screw-thread has a first outer diameter which is substantially larger than a second outer diameter of said sleeve.

5. An anchor sleeve as defined in claim 4, wherein the ratio of said first outer diameter to said second outer diameter is substantially 3:1 and 1.8:1.

6. An anchor sleeve as defined in claim 1, wherein said screw-thread has a pitch of between 10–15 mm.

7. An anchor sleeve as defined in claim 1; and further comprising engaging portions on said trailing end for engagement by a tool serving to facilitate threading of said sleeve into a bore.

8. An anchor as defined in claim 1, wherein said sides include with one another an angle of substantially 90°.

9. An anchor as defined in claim 1, said sleeve having a central passage bounded by an inner surface which is formed with portions resembling a screw-thread.

10. An anchor as defined in claim 1, said body being formed with at least one thread-shaped groove in its outer circumferential surface.

11. An anchor as defined in claim 1, wherein said body has a portion at said trailing end which diverges away from said leading end in frustoconical configuration.

12. An anchor as defined in claim 1, wherein said body has an enlarged portion at said trailing end.

13. An anchor as defined in claim 1, said body having at said trailing end a frustoconical enlargement formed with a recess in said outer surface, said recess being in part bounded by a cutting edge.

14. An anchor as defined in claim 1, said slot being bounded by longitudinally extending edge regions; and further comprising at least one web portion spanning said slot and integral with said edge regions thereof.

* * * * *